Sept. 19, 1961        O. E. HILL        3,000,150

GRINDING MACHINE

Filed May 19, 1959        2 Sheets-Sheet 1

INVENTOR
OIVA E. HILL
BY
Harold W. Eaton
ATTORNEY

United States Patent Office 3,000,150
Patented Sept. 19, 1961

3,000,150
GRINDING MACHINE
Oiva E. Hill, West Boylston, Mass., assignor to Norton Company, Worcester, Mass., a corporation of Massachusetts
Filed May 19, 1959, Ser. No. 814,312
18 Claims. (Cl. 51—165)

The invention relates to grinding machines and more particularly to an automatic work size control mechanism therefor. One object of the invention is to provide a simple and thoroughly practical work size control and truing apparatus for a grinding machine. Another object is to provide a truing apparatus arranged for either a continuous or an intermittent truing cycle. Another object is to provide an automatic feed mechanism for the truing tool which is arranged to feed the truing tool either at the ends of the traversing movement thereof or between reversals thereof during a continuous truing cycle, or to automatically feed the truing tool during an intermittent truing cycle.

Another object is to provide a grinding machine with a truning tool feeding mechanism and a wheel feed compensating mechanism arranged so that a continuous truing cycle may be obtained with an automatic actuation of the feed and compensating mechanisms at each end of the truing tool stroke during a continuous truing cycle. Another object is to provide means whereby an automatic sizing adjustment may be obtained between reversals during a continuous truing cycle. A further object is to provide means whereby automatic sizing adjustments may be obtained during an intermittent truing cycle. Another object is to provide a selector control mechanism whereby any of the above mentioned cycles may be obtained as desired. Other objects will be in part obvious or in part pointed out hereinafter.

Figure 1:
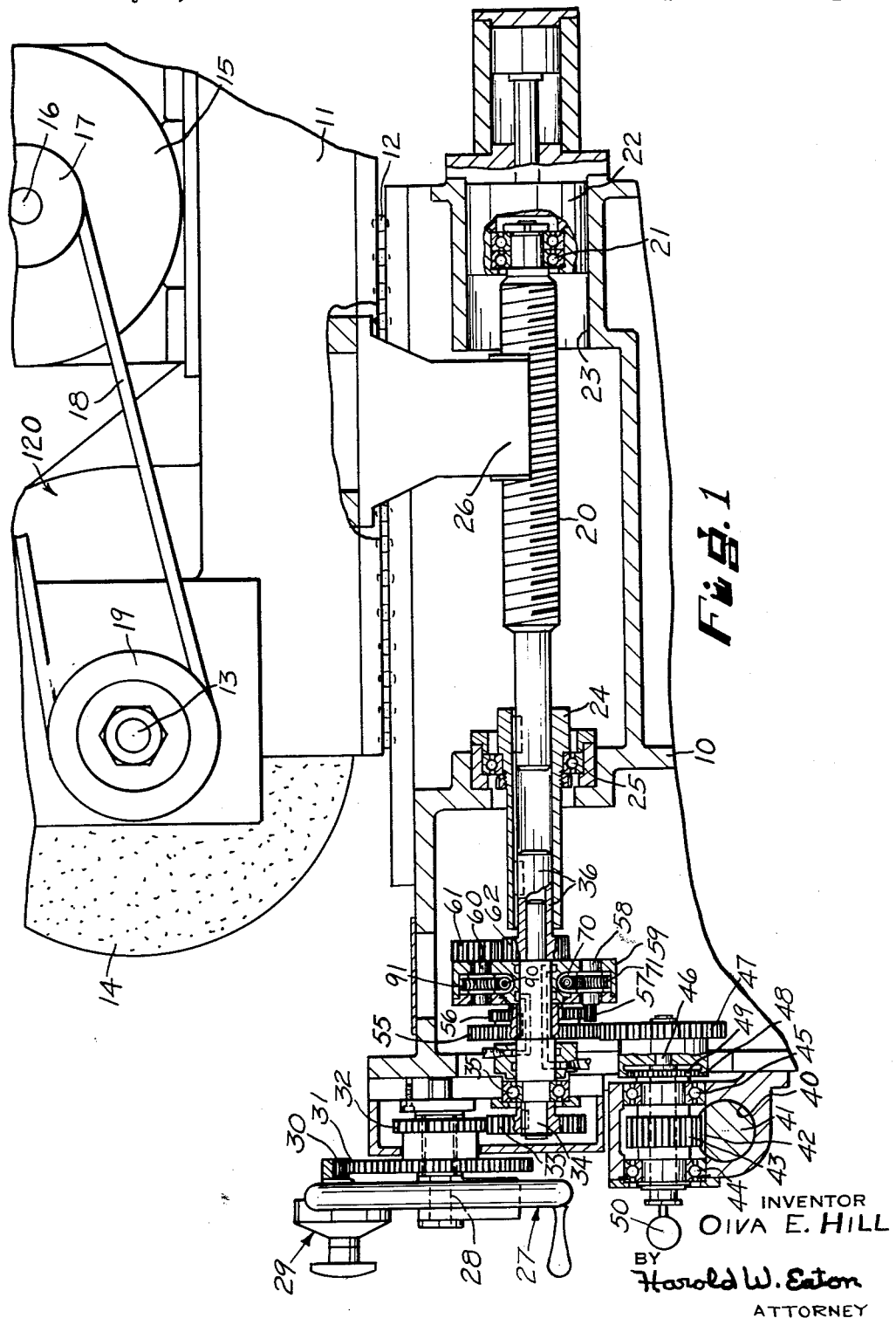
Figure 2:
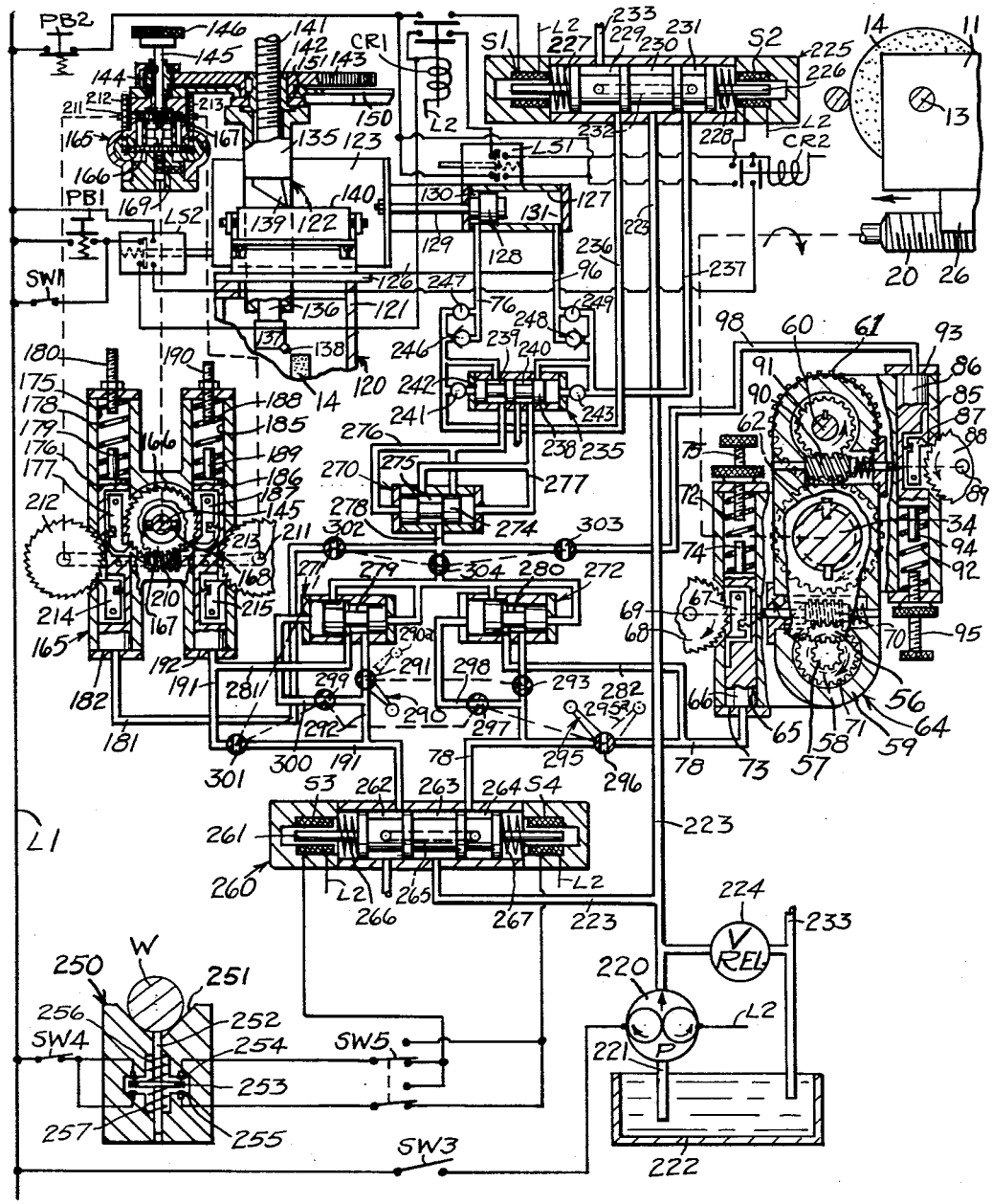

In the accompanying drawings, is shown one of various possible embodiments of the mechanical features of this invention;

FIG. 1 is a fragmentary sectional view through a grinding machine showing the wheel feeding mechanism; and FIG. 2 is a combined hydraulic and electric diagram of the actuating mechanisms and the controls therefor.

A cylindrical grinding machine has been illustrated in the drawings comprising a base 10 which supports a transversely movable wheel slide 11 on antifriction ways 12 on the base 10. The wheel slide 11 supports a rotatable wheel spindle 13 in the usual well known spindle bearings (not shown). A grinding wheel 14 is mounted on one end of the spindle 13.

A driving mechanism is provided for imparting a rotary motion to the wheel spindle 13 and the grinding wheel 14 comprising an electric motor 15 which is mounted on the upper surface of the wheel slide 11. The motor 15 is provided with a motor shaft 16 having a multiple V-groove pulley 17 which is connected by multiple V-belts 18 with a multiple V-groove pulley 19 mounted on the other end of the wheel spindle 13.

A wheel feeding mechanism is provided comprising a rotatable feed screw 20, the right hand end of which is journaled in anti-friction bearings 21 carried by a slidably mounted sleeve 22 which is supported in a cylindrical aperture 23 formed within the base 10. The left hand end of the feed screw 20 is formed as a reduced diameter cylindrical extension which is slidably connected within a rotatable sleeve 24. The sleeve 24 is journaled in an anti-friction bearing 25 supported by the base 10. The wheel slide 11 is provided with a depending half nut 26 which meshes with or engages the feed screw 20.

A manually operable feed mechanism is provided for actuating the feed screw 20 comprising a manually operable feed wheel 27 which is rotatably supported on a shaft 28. The feed wheel 27 is connected by a well known micrometer feed adjusting mechanism 29 with a pinion 30 which meshes with a gear 31 rotatably mounted on shaft 28. A gear 32 is fixedly mounted to the gear 31 and meshes with a gear 33 which is connected onto the left hand end of a rotatable shaft 34. The left hand end of the shaft 34 is journaled in an anti-friction bearing 35. The right hand end of the shaft 34 is rotatably supported within a hole on shaft 36 which is slidably connected within the sleeve 24. A wheel feed compensating mechanism, to be hereinafter described, is connected between the shaft 34 and the hole on shaft 36 to impart a rotary motion to the feed screw 20 when the feed wheel 27 is rotated.

A hydraulically operated mechanism is provided for imparting a rotary motion to the feed screw 20. This mechanism has not been illustrated in detail in the present application, since it is substantially identical with that shown in the prior U.S. patent to H. A. Silven, No. 2,572,529 dated October 23, 1951. This mechanism comprises a cylinder 40 which contains a slidably mounted piston 41. The surface of the piston 41 is provided with rack teeth 42 which mesh with a gear 43. The gear 43 is rotatably journaled in a pair of spaced anti-friction bearings 44 and 45. A shaft 46 is rotatably journaled within a central aperture formed within the gear 43 and is provided with a gear 47 fixedly mounted on the right hand end thereof. A clutch mechanism is provided for connecting the gear 43 with the shaft 46. This clutch mechanism comprises an internal gear-shaped clutch element 48 which, as shown in FIG. 1, meshes with an external gear-shaped clutch element 49. The clutch element 49 is fixedly mounted to rotate with the gear 43. An actuating knob 50 is mounted on the left hand end of the shaft 46. When it is desired to declutch the shaft 46 and the gear 47 from the gear 43, the knob 50 is moved toward the right to shift the shaft 46 toward the right so as to slide the internal gear-shaped clutch element 48 out of mesh with the external gear-shaped clutch element 49.

The gear 47 meshes with a gear 55 which is connected to the shaft 34. A gear 56 is fixedly mounted relative to the gear 55 and meshes with a pinion 57 formed on the left hand end of the shaft 58. The shaft 58 is supported within a casing 59 which in turn supports the feed compensating mechanism. The casing 59 supports a shaft 60 which is provided with a gear 61 on its right hand end. The gear 61 meshes with a gear 62 which is fixedly mounted on and concentric of the hole in shaft 36. The shafts 58 and 60 are normally held against rotation relative to the casing 59 in a manner to be hereinafter described. It will be readily apparent that a rotary motion imparted to the gear 55, either by the manually operable feed wheel 27 or by the piston 41, will be imparted through the gear 55 to the gear 56. Due to the fact that the shafts 58 and 60 are normally held against rotary motion, a rotary motion of the gear 56 will be transmitted through the pinion 57 to rotate the compensator casing 59. The rotary motion of the casing 59 serves to cause the gear 61 to impart a rotary motion to the gear 62 thereby imparting a rotary motion to the feed screw 20. The direction of rotation of the feed wheel 27 or the direction of movement of the piston 41 serves to determine whether a forward or rearward movement of the wheel slide 11 is obtained.

A wheel feed compensating mechanism is provided which operates by and in timed relation with a grinding wheel truing apparatus to be hereinafter described. The truing apparatus is arranged so that either an intermittent or a continuous truing cycle may be obtained. A wheel feed compensating mechanism is provided so that grinding wheel compensation may be made either during an intermittent truing operation of the wheel or during a continuous truing operation on the grinding wheel.

The compensation of the wheel feed mechanism for continuous truing the grinding wheel will now be described. A hydraulically operated feed compensating unit 64 contained in casing 59 and shown best in FIG. 2 is supported on the shaft 34 and is provided with a cylinder 65 which contains a slidably mounted piston 66. The piston 66 is provided with a spring pressed pawl 67 which is arranged to engage the teeth of a ratchet wheel 68. The ratchet wheel 68 is mounted on the left hand end of a rotatable shaft 69 which also supports a worm 70 which meshes with a worm gear 71 keyed onto the shaft 58. A compression spring 72 serves normally to hold the piston 66 in a downward position. When it is desired to cause a compensating size adjustment of the wheel feed mechanism during a continuous truing operation, fluid is passed through a pipe 78 into a cylinder chamber 73 formed at the lower end of the cylinder 65 to cause an upward movement of the piston 66. During the upward movement of the piston 66, the pawl 67 rides idly over the teeth of the ratchet wheel 68. The upward movement of the piston 66 continues until a piston rod 74 attached to or formed integral with the upper end of the piston 66 engages an adjustable stop screw 75. When fluid under pressure is allowed to exhaust from the cylinder chamber 73, the released compression of the spring 72 causes a downward movement of the piston 66 during which movement the pawl 67 turns the ratchet wheel 68 to impart a compensating adjustment to the feed screw 20 in the manner described below as the truing tool starts its traversing movement. The operative connections between the continuous compensating adjusting mechanism and the feed screw are such that for each tooth on the ratchet wheel, a compensating adjustment will be imparted to the feed screw 20 to advance the wheel slide 11. The number of teeth of the ratchet wheel 68 advanced during each compensating adjustment may be determined by the upward movement of the piston 66 as governed by the stop screw 75.

A compensating adjustment by the mechanism above described during a continuous grinding wheel truing operation is obtained in the following manner. Rotary motion of the worm gear 71 produced by rotation of worm 70 with ratchet wheel 68 imparts a rotary motion to the pinion 57 to cause the pinion 57 to roll upon the gear 56 thereby imparting a slight rotary motion to the casing 59. The rotary motion of the casing 59 is transmitted through the now stationary gear 61 to impart a rotary motion to the gear 62 mounted on shaft 36 and thereby to impart a compensating adjustment to the feed screw 20 through the sleeve 24 slidably connected with shaft 36 and with feed screw 20. When fluid under pressure is passed through the pipe 78 into the cylinder chamber 73, the compensator is actuated as above described.

The wheel feed compensating mechanism for compensating during an intermittent grinding wheel truing operation will now be described. The compensating unit 64 is provided with a cylinder 85 which contains a slidably mounted piston 86. The piston 86 is provided with a spring pressed pawl 87 which is arranged to engage the teeth of a ratchet wheel 88. The ratchet wheel 88 is mounted on the right hand end of a rotatable shaft 89 which also supports a worm 90 meshing with a worm gear 91 keyed to the shaft 60. A compression spring 92 serves normally to hold the piston 86 in an uppermost position. When it is desired to cause a compensating adjustment of the wheel feeding mechanism during an intermittent grinding wheel truing operation, fluid under pressure is passed into a cylinder chamber 93 formed at the upper end of the cylinder 85 to cause a downward movement of the piston 86. During the downward movement of the piston 86, the pawl 87 engaging the teeth of the ratchet wheel 88 imparts a counter clockwise rotary motion to the ratchet wheel 88 and the shaft 89. The worm 90 and the gearing associated with the compensating mechanism are such that for each tooth on the ratchet wheel 88, a feed compensating adjustment is made. The downward movement of the piston 86 continues until a piston rod 94 fixedly mounted on the piston 86 engages an adjustable stop screw 95. When fluid is allowed to exhaust from the cylinder chamber 93, the release compression of the spring 92 causes an upward movement of the piston 86 during which movement the pawl 87 rides idly over the teeth of the ratchet wheel 88. The number of teeth of the ratchet wheel 88 which are picked up at each actuation of the compensating mechanism is determined by the adjustment of the stop screw 95.

A compensating adjustment of the mechanism above described during intermittent truing of the grinding wheel is obtained in the following manner. Rotary motion of the worm gear 91 produced by rotation of the worm 90 with ratchet wheel 88 serves to impart a rotary motion to the shaft 60 and the gear 61 to impart a corresponding rotary motion to the gear 62 and the feed screw 20. During this compensation, no rotary motion is imparted to the casing 59 relative to the shaft 34.

When fluid under pressure is passed through a pipe 98 into the cylinder chamber 93, a compensating adjustment is made when the truing tool 138 starts traversing across the operative face of the grinding wheel during an intermittent truing operation.

Since the respective wheel feed compensating mechanisms described above are alternatively operable in connection with a continuous truing cycle and in connection with an intermittent cycle, only one of the feed compensators is operative at any given time. The selection of the required feed compensator and the inactivation of the other feed compensator is accomplished by selector valves described in detail further below.

The grinding wheel 13 is partially surrounded by a wheel guard 120 which is fastened to or fixedly mounted on the wheel slide 11. The wheel guard 120 is provided with an upwardly extending housing 121 as seen in FIG. 2 which serves as a support for a grinding wheel truing apparatus 122. The truing apparatus 122 is similar to that disclosed in my prior U.S. Patent No. 2,647,504 dated August 4, 1953. The truing apparatus is provided with a longitudinally movable slide 123 which is supported by slideways (not shown) formed on the truing apparatus base 126. A hydraulically operated mechanism is provided for traversing the slide 123 longitudinally in either direction. This mechanism comprises a cylinder 127 which contains a slidably mounted piston 128. The piston 128 is connected to the right hand end of a piston rod 129, the left hand end of which is fixedly connected to the slide 123. It will be readily apparent from the foregoing disclosure that when fluid under pressure is passed through a pipe 76 into a cylinder chamber 130 formed at the left hand end of the cylinder 127, the piston 128 together with the slide 123 will be traversed toward the right. During this movement fluid within a cylinder chamber 131 exhausts through a pipe 96. Similarly when fluid under pressure is reversed and passed through the pipe 96, the piston 128 together with the slide 123 will be moved or traversed toward the left. The longitudinally movable slide 123 supports a vertically arranged sleeve 135. A vertically arranged truing tool holder shaft 136 is supported within the sleeve 135. A truing tool holder 137 having a diamond or truing tool 138 is mounted on the lower end of the shaft 136. The sleeve 135 is arranged to slide vertically within the slide 123. A follower 139 fastened to the sleeve 135 rides upon a forming bar 140 which is fixedly mounted on the truing apparatus base 126. In the present case the forming bar is provided with a plane operative face so that the truing tool will be moved in a straight line path when the longitudinally movable slide 123 is traversed in either direction.

A suitable feeding mechanism is provided for adjusting the truing tool 138 relative to the sleeve 135 and the slide 123. This mechanism comprises a feed screw 141 formed on the upper end of the truing tool holder shaft 136. A rotatable feed nut 142 meshes with the feed screw 141. A gear 143 is keyed to the nut 142 and meshes with a small gear 144 which is keyed onto a rotatable shaft 145. The upper end of the shaft 145 is provided with a manually operable feed wheel 146 by means of which the nut 142 may be rotated in either direction vertically to adjust the position of the truing tool 138.

The grinding wheel truing apparatus is preferably arranged so that either a manually controlled intermittent or a continuous grinding wheel truing cycle may be obtained. A truing tool feeding mechanism is provided which is actuated at the ends of the reciprocating stroke of the truing tool 138. The feed nut 142 is first rotated in one direction to unwind or back-off the feed nut 142, the feed nut 142 is then given a predetermined incremental rotary motion to feed truing tool 138 downwardly by a predetermined increment after which the feed nut 142 is rotated in the opposite direction to wind or advance the nut to a predetermined stopped position before the truing tool 138 starts its traverse across the periphery of the grinding wheel 13. The arrangement for unwinding or backing off the feed nut 142 is neither illustrated nor described in this application, because this mechanism does not constitute a patentably significant feature of the device comprising the instant invention. One suitable arrangement for accomplishing this result is described in detail and illustrated in FIGS. 5 and 6 of my prior Patent No. 2,895,265 issued July 21, 1959. The oscillatable plate 150 described and illustrated in this patent corresponds to the oscillatable plate 150 referred to below and illustrated in FIG. 2.

An oscillatable plate 150 is rotatably supported on a hub 151 formed integral with the gear 143. The plate 150 serves as a support for the rotatable shaft 145 and also for the truing tool feeding mechanism to be hereinafter described. A truing tool feeding unit 165 is provided which is fixedly mounted on the underside of the plate 150. The unit 165 together with the plate 150 serves rotatably to support the shaft 145. A ratchet wheel 166 and a worm gear 167 are rotatably supported on the shaft 145 and arranged so that one or the other may be clutched to the shaft 145 as desired. The shaaft 145 is arranged so that an axial movement thereof within the unit 165 serves to connect a drive pin 168 with a notch formed in the ratchet wheel 166 or may be moved upwardly into engagement with a notch within the hub of the worm gear 167. A spring pressed detent 169 is arranged to engage one of a plurality of grooves formed in the periphery of the shaft 145 so as to facilitate holding the shaft to engage either the ratchet wheel 166 or the worm gear 167 relative thereto. If the shaft is moved vertically so that the detent 169 engages a central groove in the shaft 145, the drive pin 168 is in a neutral position in which both the ratchet wheel 166 and the worm gear 167 are declutched from the shaft 145. If a very fine feeding increment is desired, the shaft 145 is moved upwardly so that the detent engages the lower groove in the shaft 145 to position drive pin 168 in an uppermost position so as to lock the worm gear 167 relative to the shaft 145. Similarly, if a coarse feed is desired, the shaft 145 is moved downwardly so that the drive pin 168 engages the notch formed within the ratchet wheel 166. In this position of the parts the detent 169 engages the upper groove formed in the shaft 145.

A fluid pressure operated mechanism is provided for actuating the ratchet wheel 166 which is arranged so that a down feeding movement of the truing tool 138 may be obtained automatically at the start of the traversing stroke of the truing tool. This mechanism comprises a cylinder 175 which contains a slideably mounted piston 176. The piston 176 is provided with a spring pressed pawl 177 which is arranged to engage the teeth of the ratchet wheel 166. A compression spring 178 serves normally to hold the piston 176 in the position shown in FIG. 2. The piston is provided with an axially extending projection 179 which is arranged to engage an adjustable stop screw 180 to determine the stroke of the piston 176 and thereby to determine the number of teeth of the ratchet wheel 166 which are picked at each reciprocation of the piston 176. When fluid under pressure is passed through a pipe 181 into a cylinder chamber 182, the piston 176 moves upwardly as shown in FIG. 2 so that the pawl 177 engaging the teeth of the ratchet wheel 166 imparts a rotary motion thereto. When fluid under pressure is exhausted through the pipe 181 from the cylinder chamber 182, the released compression of the spring 178 causes a downward movement of the piston 176 during which movement the pawl 177 rides idly over the teeth of the ratchet 166. The number of teeth of the ratchet wheel picked at each upward stroke of the piston 176 is determined by the setting of the stop screw 180. The above described mechanism serves to initiate a downward feednig movement of the truing tool 138 as the truing tool starts a traversing movement toward the right.

A similar mechanism is provided for imparting a downward feeding movement of the truing tool for sizing or continuous truing. This mechanism comprises a cylinder 185 which contains a slidably mounted piston 186. The piston 186 is provided with a spring pressed pawl 187 which is arranged to engage the teeth of the ratchet wheel 166. A compression spring 188 serves normally to hold the piston 186 in the position shown in FIG. 2. The piston 186 is provided with an axially extending projection 189 which is arranged to engage an adjustable stop screw 190. The setting of the adjusting screw 190 serves to determine the number of teeth of the ratchet wheel picked during each downward movement of the piston 186. When fluid under pressure is passed through a pipe 191 into a cylinder chamber 192, the piston 186 moves upwardly during which movement the pawl 187 rides idly over the teeth of the ratchet wheel 166. When fluid is exhausted from the pipe 191, the released compression of the spring 188 imparts a downward movement to the piston 186 during which movement the pawl 187 engaging the teeth of the ratchet wheel 166 imparts a clockwise rotary adjustment thereto.

The grinding wheel truing apparatus is arranged so that a continuous truing of the grinding wheel may be obtained when desired. In this case a continuous reciprocation of the truing tool 138 is obtained with a fine downfeeding movement of the truing tool at the start of each truing tool stroke. The worm gear 167 meshes with a worm 210 which is mounted on a rotatable shaft 211. A pair of spaced ratchet wheels 212 and 213 are mounted on the opposite ends of the shaft 211. In the actual construction, the ratchet wheels 212 and 213 together with the shaft 211 are arranged at right angles to the ratchet wheel 166 and the shaft 145. As shown diagrammatically in FIG. 2, the shaft 211 together with the ratchet wheels 212 and 213 are shown in the same plane with the ratchet wheel 166. A spring pressed pawl 214 is mounted on the piston 176 and a spring pressed pawl 215 is mounted on the piston 186. When it is desired to obtain a fine feed of the truing tool 138 during a continuous truing operation, the knob 146 together with the shaft 145 are moved upwardly so that the detent 169 engages the lower groove on the shaft 145 and so that the driving pin 168 engages the notch in the hub of the worm gear 167. In this position of the parts, when fluid under pressure is admitted to the cylinder chamber 130 to cause the piston 128 together with the slide 123 to move toward the right, fluid under pressure is also passed through the pipe 181 into the cylinder chamber 182 to cause an upward movement of the piston 176 and the pawl 214. The pawl 214 engaging the ratchet wheel 212 imparts a rotary motion to the shaft 211 and through the worm 210 and worm gear 167 imparts a downward feeding movement to the truing tool 138. When fluid under pressure is free to exhaust through the pipe 181, the released compression of the spring 178 causes a downward movement of the piston 176 during which movement the pawl 214 rides idly over the ratchet wheel 212.

The admission of fluid under pressure to the cylinder chamber 182 occurs while a member 238 contained in a shuttle valve 235 illustrated in FIG. 2 is moving from a first extreme position to a second extreme position within the valve 235. The valve 235 will be described in further detail below, so that it is sufficient to note at this point that the flow of fluid under pressure through valve 235 occurs only while the member 238 is moving between its extreme positions, and that when the member 238 reaches its second extreme position the fluid under pressure admitted to cylinder chamber 182 is released to the return side of the hydraulic system.

Similarly when fluid under pressure is passed through the pipe 191 into the cylinder chamber 192, the piston 186 is moved upwardly during which movement the pawl 215 engaging the teeth of a ratchet wheel 213 imparts a rotary motion to the shaft 211 so as to impart downfeeding increment to the truing tool 138. When fluid is free to exhaust through the pipe 191, the released compression of the spring 188 causes a downward movement of the piston 186 during which movement the pawl 215 rides idly over the teeth of the ratchet wheel 213.

A fluid pressure system is provided for supplying fluid under pressure to the actuating mechanisms of the machine. This mechanism comprises a motor driven fluid pump 220 which may be started and stopped by actuation of the switch SW3. The pump 220 draws fluid through a pipe 221 from a reservoir 222 and forces fluid under pressure through a pipe 223 to the various mechanisms of the machine. A pressure relief valve 224 is provided in the pipe line 223 to facilitate exhausting excess fluid under pressure directly to the reservoir 222 so as to maintain a substantially uniform operating pressure within the fluid system.

A control valve 225 is provided for controlling the admission to and exhaust of fluid from the cylinder 127 and also to the feed compensator 64 and the truing tool feeding unit 165. The valve 225 is a piston type valve comprising a slidably mounted valve member 226 which is normally held in a central position by a pair of compression springs 227 and 228. The slidably mounted valve member 226 is provided with a plurality of spaced integral valve pistons to form a plurality of spaced valve chambers 229, 230, and 231. The valve member 226 is also provided with a central passage 232 which interconnects the valve chamber 229 with the valve chamber 231. An exhaust pipe 233 is provided to exhaust fluid from the control valve 225 to the reservoir 222. A pull type solenoid S1 is provided which when energized serves to shift the valve member 226 toward the left. Similarly a pull type solenoid S2 is provided which when energized serves to shift the valve member 226 into a right hand end position.

A shuttle type control valve 235 is provided which is connected to the valve 225 by a pair of pipes 236 and 237. The shuttle type valve 235 is provided with a slidably mounted valve member 238 having a plurality of spaced valve pistons to form a pair of spaced valve chambers 239 and 240. As noted briefly above, valve member 238 moves within valve 235 between two extreme positions, one, as shown in FIG. 2, in which the pipe 277 is connected to the exhaust side of the system, and the other in which the pipe 276 is connected to the exhaust side of the system. In addition, while valve member 238 is moving toward the left to the position illustrated in FIG. 2 under the influence of pressurized fluid passing through pipe 237, this pressurized fluid is also passed through valve 235 to pipe 277, and while valve member 238 is moved to the right away from the position illustrated in FIG. 2 under the influence of pressurized fluid in pipe 236, this pressurized fluid is also passed through valve 235 to pipe 276.

When the solenoid S1 is energized and the valve member 226 shifted toward the left fluid from the pressure pipe 223 enters the valve chamber 230 and passes through the pipe 236, through a throttle valve 241 into an end chamber 242 formed at the left hand end of the valve 235. Pressure passing through the valve 241 shifts the valve member 238 toward the right at a rate controlled by a throttle valve 243. Fluid under pressure passing through the pipe 236 also passes through a ball check valve 246 and through a throttle valve 247 and thence through the pipe 76 into the cylinder chamber 130 to start the piston 128 together with the truing tool slide 123 moving toward the right. During this movement fluid within the cylinder chamber 131 exhausts through the pipe 96, through a throttle valve 249 and thence through the pipe 237 into the valve chamber 231, through the central passage 232, through the valve chamber 229 and exhausts through the pipe 233. A ball check valve 248 is provided to allow unrestricted passage of fluid from the pipe 237 into the pipe 96 when the flow of fluid under pressure is reversed.

Similarly when solenoid S2 is energized to shift the valve member 226 toward the right fluid under pressure entering the valve chamber 230 passes through the pipe 237, through the throttle valve 243 into an end chamber formed at the right hand end of the valve 235 to shift the valve member 238 toward the left. At the same time fluid under pressure passing through the pipe 237 passes through the ball check valve 248 and the throttle valve 249, through the pipe 96 into the cylinder chamber 131 to move the piston 128 together with the truing tool slide 123 toward the left, thereby starting a second traverse of the truing tool across the operative face of the grinding wheel 14.

A gaging device of any of the well known standard makes may be provided such as a post process gage 250 to gage a work piece after the grinding operation. This gage comprises a V-notch 251 upon which a work piece W is placed after it has been ground in the machine. This gage may be located on the work table or at any convenient location adjacent to the operator's control station. The gage comprises a slidably mounted plunger 252 which carries a contact member 253 which is arranged to engage one of two pairs of contactors 254 or 255 when the plunger 252 is moved either up or down. The member 253 is normally held in a neutral position by a pair of balanced compression springs 256 and 257.

The gage 250 is arranged to control a valve 260 which is in turn arranged to actuate either the feed compensator unit 64 or the truing tool feeding unit 165 depending upon whether the work piece W is oversize or undersize. The valve 260 is a piston type valve comprising a slidably mounted valve member 261 having a plurality of valve pistons formed integrally therewith to form spaced valve chambers 262, 263, and 264. The valve member 261 is provided with a central passage 265 which interconnects the valve chamber 262 with he valve chamber 264. A pair of balanced compression springs 266 and 267 are provided normally to hold the valve member 261 in a central or neutral position. Fluid under pressure from the pipe 223 enters the valve chamber 263 and passes through either the pipe 191 to the truing tool feed unit 165, or through the pipe 78 to the compensating unit 64 depending upon the direction of movement of the valve member 61.

When the push type solenoid S3 is energized, the valve member 261 shifts toward the right so that fluid under pressure within the valve chamber 263 passes through the pipe 78 to impart a feed compensating adjustment to the unit 64. Similarly when the push type solenoid S4 is energized the valve member 261 is shifted toward the left so that fluid under pressure within the valve chamber 263 passes through the pipe 191 to the truing tool feeding unit 165.

A plurality of sequence valves 270, 271, and 272 are provided between the valve 235 and the truing tool feeding mechanism 165 and the feed compensator 64. The sequence valve 270 is a piston type valve having a slidably mounted valve member 274 which is provided with a pair of spaced valve pistons to form a valve chamber 275. A pair of pipes 276 and 277 connect the sequence valve 270 with the valve 235. A pipe 278 connects the sequence valve 270 either with the sequence valves 271 and 272 or to the truing tool feed mechanism 165 or the feed compensator unit 64, in a manner to be hereinafter described. The sequence valve 271 is a piston type valve having a pair of spaced valve pistons forming a valve chamber 279. The sequence valve 272 is an identical piston valve having a pair of spaced valve pistons forming a valve chamber 280. The left hand piston of each of the valves 271 and 272 is larger in diameter than the right hand piston thereof to facilitate shifting the valves from a left hand end position to a right hand end position under certain conditions as will be hereinafter described.

A pipe 281 connects the sequence valve 271 with the truing tool feed unit 165. Similarly the pipe 282 connects the sequence valve 272 with the feed compensator unit 64.

A selector valve 290 is provided with a passage 291 which controls the passage of fluid through a pipe 292 to sequence valve 271. The selector valve 290 is also provided with a passage 293 which connects the pipe 78 with the sequence valve 272. The selector valve 290 may be shifted into position 290a, as shown in dotted lines, when desired, to close the passages 291 and 293.

A selector valve 295 is provided having a plurality of passages 296, 297, 299, 301, 302, 304, and 303. The passage 296 is in the pipe 78 to connect the valve 260 with the compensator cylinder 65. The passage 297 is located between the pipe 78 and the pipe 298 so that when opened it allows passage of fluid from the pipe 78 into the left hand end of the sequence valve 272. The passage 299 is located in the pipe connecting pipe 282 and pipe 300 so that when opened it allows fluid to pass to the left hand end of the sequence valve 271. The passage 301 is located in the pipe 191 so as to pass fluid from the valve 260 to the feed cylinder 185 when opened. The passage 302 is located in the pipe line connecting the pipe 278 with the pipe 181 so that when opened it serves to pass fluid through the pipe 181 to feed cylinder 175. The passage 303 is located in the pipe connecting pipe 278 with pipe 98 so that when opened it serves to pass fluid under pressure through the pipe 88 to the cylinder 85. The passage 304 is located in the pipeline 278 so that when opened it serves to pass fluid under pressure to the sequence valves 271 and 272.

When the selector valve 295 is shifted in a clockwise direction into the dotted line position 295a, as shown in FIG. 2, the passages 296, 301, 302, and 303 are opened and the passages 297 and 299 are closed and the passage 304 is closed. By manipulation of the selector valves 290 and 295, the truing tool feed and the wheel feed compensating mechanisms may be actuated automatically as desired.

*Work sizing supplementing a continuous truing cycle*

With the selector valves 290 and 295 positioned as shown in FIG. 2, the switch SW4 closed and switch SW5 positioned as shown in FIG. 2, and the truing apparatus feed clutch pin 168 raised into a fine feeding position, as shown in FIG. 2, a continuous truing cycle with work sizing is obtained by closing switch SW1. The closing of switch SW1 energizes a relay switch CR1 which sets up a holding circuit through the normally closed contacts of limit switch LS1 and at the same time, energizes the solenoid S1 to shift the the valve member 226 toward the left thereby starting a traversing movement of the truing tool 138 toward the right. When the valve member 226 moves toward the left fluid under pressure is passed through the pipe 236 to shift the shuttle valve 235 into a right hand end position. Fluid under pressure also passes through the throttle valve 247 and the ball check valve 246, and through the pipe 76 to move the piston 128 toward the right. During movement of the valve 235 toward the right fluid under pressure passes through the valve chamber 239, through the pipe 276 to shift the sequence valve member 274 toward the right. After the valve member 274 reaches a right hand end position fluid under pressure passing through the pipe 276 passes through the valve chamber 275, through the pipe 278 through the passage 304 in the selector valve 295 to shift the sequence valves 271 and 272 into left hand end positions. When the valve 271 reaches a left hand end position, fluid passing through the passage 304 enters the valve chamber 279 and passes through the pipe 281 into the cylinder chamber 192 to move the piston 186 upwardly thereby imparting a fine downfeed increment to the truing tool 138. At the same time, when the sequence valve 272 reaches a left hand end position, fluid passing through the passage 304 enters the valve chamber 280 and passes through the pipe 282 into the cylinder chamber 73 to cause an upward movement of the piston 66 thereby imparting a fine compensating adjustment to the wheel feeding mechanism. It should be noted that the hydraulic system illustrated in FIG. 2 is so arranged that the respective sequence valves 271 and 272 tend to remain in their left hand end positions opposite to the positions illustrated in FIG. 2 so that pressurized fluid is admitted to the cylinder chambers 192 and 73 as described above with each reversal of the truing mechanism.

Both the fine downfeeding of the truing tool 138 and the compensating feed of the grinding wheel 13 take place before the truing tool traverses into engagement with the grinding wheel during its traverse toward the right. When the truing tool 138 starts moving toward the right, the normally closed contacts of the limit switch LS2 close. When the truing tool slide 123 reaches the right hand end of its stroke, the limit switch LS1 is actuated and the normally closed contacts thereof are opened to break the holding circuit to deenergize the relay switch CR1 thereby deenergizing the solenoid S1. At the same time the normally open contacts of the limit switch LS1 close to energize the relay switch CR2 which sets up a holding circuit through the contacts of the limit switch LS2 and at the same time, energizes the solenoid S2 to shift the valve member 226 toward the right so that fluid under pressure within the valve chamber 230 passes through the pipe 237 to shift the shuttle valve 235 toward the left, and also passes through the throttle valve 249 and the ball check valve 248 into the right hand end of the cylinder 127 to start the piston 128 together with the slide 123 and the truing tool 138 traversing toward the left.

At the same time fluid under pressure is admitted to the right hand end of valve 235 through throttle valve 243, and as valve 235 moves toward the left, fluid under pressure from the pipe 237 passes through the valve chamber 240, through the pipe 277 to shift the sequence valve 270 into a left hand end position. When the sequence valve 270 reaches a left hand end position fluid under pressure entering the valve chamber 275 passes through the pipe 278, through the passage 304 in the selector valve 295 and serves to move the sequence valves 271 and 272 to the left if they are in a right hand end position so as to pass fluid under pressure into the cylinder chambers 192 and 73 respectively to impart a fine feeding adjustment to the truing tool feed unit 165 and a fine compensating feed to the feed compensator 64.

As noted above, the hydraulic system illustrated in FIG. 2 is so arranged that the respective sequence valves 271 and 272 tend to remain in their left hand position during successive reciprocations of the truing mechanism. However, when there is a signal generated by the contacts in the post process gauge 250 described in detail below, it is necessary to shift one of these sequence valves to the right in order to permit the delivery of pressurized fluid to the appropriate compensator from the valve 260 which operates in response to signals from the post process gauge 250. The sequence of operations outlined above is provided to insure that the respective sequence valves 271 and 272 are restored to their left hand positions if they have been moved to a right hand position by operation of the valve 260 in response to a signal from post process gauge 250. The movement of the respective sequence valves 271 and 272 to their right hand positions under the circumstances described below is assured by the fact that the left hand piston is larger than the right hand piston in each of these valves. Thus, even with a residual force applied to the relatively smaller right hand piston of either sequence valve by the pressurized fluid, the force applied to the relatively larger left hand piston of either sequence valve by fluid at the same pressure will always be larger than the force applied to the right hand piston.

The feeding movement of the truing tool 138 and compensating feed adjustment of the grinding wheel 14 takes place as the truing tool 138 starts its traverse toward the left and before the truing tool engages the operative face of the grinding wheel. This cycle repeats continuously as long as the switch SW1 remains closed to provide a continuous reciprocation of the truing tool across the operative face of the grinding wheel with a fine downfeeding adjustment of the truing tool and a fine compensating feed of the grinding wheel before each pass of the truing tool. The continuous truing cycle is terminated by opening switch SW1.

Work pieces after grinding may be placed on the post process gage 250. If the work piece is oversize the gage contacts 254 are closed to energize the solenoid S3. The solenoid S3 is a push-type solenoid which when energized shifts the valve member 261 toward the right. In this position of the valve 260 fluid under pressure entering the valve chamber 263 passes through the pipe 78, through the passage 293 in the selector valve 290, through the valve chamber 280, through the pipe 282 and the pipe 78 into the cylinder chamber 73 to impart a fine compensating feed to the grinding wheel 13. In case the sequence valve 272 is in a left hand end position, fluid passing through the pipe 78 first passes through the passage 297 in the selector valve 295, through the pipe 298 to shift the sequence valve 272 into a right hand end position.

If the work piece being gaged is undersize, the contacts 255 of the post process gage 250 are closed to energize the solenoid S4 thereby shifting the valve member 261 toward the left so that fluid under pressure within the valve chamber 263 passes through the pipe 191, through the pipe 292, through the passage 299 in the selector valve 295 to shift the sequence valve 271 into a right hand end position if required. Fluid under pressure passing through the pipe 292 passes through the passage 291 in the selector valve 290 into the valve chamber 279, through the pipe 281 into the cylinder chamber 192 so as to impart a fine downfeeding movement to the truing tool 138. The gage actuation of the truing tool feeding unit 165 and the grinding wheel feeding compensator 64 take place at any time during a continuous truing cycle. This is in addition to the normal downfeeding of the truing tool and compensating feed of the grinding wheel which occurs as above described at each end of the truing tool stroke during continuous truing operation.

*Sizing adjustments occurring during a continuous truing cycle at reversals of truing tool*

The selector valve 295 remains in the position shown in FIG. 2. The selector valve 290 is moved in a counter clockwise direction into position 290a so that the passages 291 and 293 are closed. The switch SW5 is moved upwardly into a reverse position. The clutch pin 168 on the truing tool feed remains in an upper position so that fine feeding movements of the truing tool are obtained. The operation of the truing tool traversing mechanism is identical with that previously described. Hence, the reversal of the truing tool is normally accompanied by a fine downfeed increment imparted to the truing tool 138 and by a fine compensating adjustment imparted to the wheel feed mechanism, except when one of these compensations is precluded in the manner described below if the post process gauging operating produces an indication that the work piece is either oversize or undersize, in which case the appropriate compensation is precluded by displacement of one of the sequence valves 271 and 272 in response to a signal from the post process gauge 250.

If an oversize work piece is placed on the post process gage 250, the contacts 254 of the gage are closed to energize the solenoid S4 thereby shifting the valve member 261 toward the left. In this position of the valve fluid entering the valve chamber 263 passes through the pipe 191, through the passage 299 in the selector valve 295, and into the left hand end chamber of the sequence valve 271 to move the valve into a right hand end position and to hold it in this position. In this position of the parts, the sequence valve 271 prevents actuation of the truing tool feeding mechanism 165.

Each time the truing tool 138 starts a traversing movement, the sequence valve 270 is shifted so as to pass fluid through the valve chamber 275, through the passage 304 in the selector valve 295, into the right hand end chamber of the sequence valve 272 to move the valve into a left hand end position. In a left hand end position fluid under pressure passing through the passage 304 passes through the valve chamber 280, through the pipe 282 through the pipe 78 into the cylinder chamber 73 to cause an upward movement of the piston 66 thereby imparting a fine compensating feed adjustment to the grinding wheel 14.

If the work piece placed on the post process gage 250 is undersize the contacts 255 of the gage 250 close thereby energizing the solenoid S3 to shift the valve member 261 toward the right so that fluid under pressure within the valve chamber 263 passes through the pipe 78, through the passage 297 in the selector valve 295 into the left hand end of the sequence valve 272 to move the sequence valve 272 into a right hand end position and to hold it in this position. This serves to prevent fluid passing to actuate the feed compensator 64. With the parts in this position, each time the truing tool 138 starts a traversing movement in either direction, the sequence valve 270 is shifted so as to pass fluid through the pipe 278, through the passage 304 in the selector valve 295 to shift the sequence valve 271 into a left hand end position. In this position of the sequence valve 271 fluid passes from the valve chamber 279, through the pipe 281 into the cylinder chamber 192 to cause an upward movement of the piston 186 so as to impart a fine downfeeding movement to the truing tool 138. This resetting of the truing tool serves to reduce the size of the grinding wheel without wheel feed compensation so that succeeding pieces of work are ground to a predetermined larger diameter.

*Work sizing with intermittent truing cycle*

The selector valve 295 is shifted in a clockwise direction into position 295a so as to open the passage 296, close the passage 297, close the passage 299, open the passage 301, open the passage 302, close the passage 304, and open the passage 303. The selector valve 290 is also shifted in a counter clockwise direction into position 290a so as to close the passages 291 and 293. With the selector valves 295 and 290 in these positions, the sequence valves 271 and 272 are rendered inoperative. The switch SW5 is positioned as shown in FIG. 2 and the switch SW1 is opened. The truing apparatus clutch pin 168 is moved downwardly to engage the notch in the ratchet wheel 166 so as to facilitate a coarse feeding adjustment of the truing tool 138. When it is desired to start a truing cycle, the push button switch PB1 is actuated to start a traversing movement of the truing tool 138 across the face of the grinding wheel 14. The traversing movement of the truing tool is controlled in a manner identical with that above described through one traversal to the right and one traversal to the left, together comprising one complete reciprocation.

With switch SW1 open, the coil of control relay CR1 is not automatically energized each time limit switch LS2 is moved to the position illustrated in FIG. 2 by movement of the tool slide 123 to the left. The coil of control relay CR1 must be energized instead by manually closing push button PB1 to initiate each intermittent truing cycle as desired.

Each time the truing tool is started in either direction, the shuttle valve 235 is actuated to shift the sequence valve 270 either toward the right or toward the left. When the sequence valve 270 is shifted fluid is passed through the pipe 278 simultaneously through the pipe 181 to actuate the piston 176 thereby causing a coarse downfeeding adjustment of the truing tool 138 and at the same time is passed to the cylinder chamber 93 to cause a downward movement of the piston 86 to impart a coarse compensating adjustment to the wheel feeding mechanism.

When an oversize work piece is placed on the post process gage, the contacts 254 are closed thereby energizing the solenoid S3 to shift the valve member 261 toward the right so that fluid under pressure within the valve chamber 263 passes through the pipe 78 to actuate the fine feed compensating piston 66 to advance the grinding wheel 14 by a predetermined increment.

Similarly if an undersize work piece is placed on the post process gage 250, the contacts 255 are closed to energize the solenoid S4 thereby shifting the valve member 261 toward the left. In this position of the valve member 261 fluid within the valve chamber 263 passes through the passage 301 into the cylinder chamber 192 to impart a fine feeding increment to the truing tool 138. It will be readily apparent from the foregoing disclosure that with the above described set-up a coarse downfeeding movement of the truing tool and a coarse compensating feed of the grinding wheel is obtained each time the truing tool 138 starts a traversing movement which occurs before the truing tool engages the grinding wheel. Each time an oversize work piece is placed on the post process gage 250, a fine feeding increment is imparted to the feed compensator 64 and each time an undersize work piece is placed on the gage a fine down-feeding movement is imparted to the truing tool 138.

It will be readily apparent from the foregoing disclosure that by manipulation of the stop screws 75, 95, 180, and 190, the stroke of the actuating pistons may be varied as desired so as to vary the extent of the coarse or fine compensating and feeding adjustments.

The present invention relates to an improvement over that disclosed in my copending application Serial No. 626,484 filed December 5, 1956, now Patent No. 2,895,265, dated July 21, 1959.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a transversely movable wheel slide, a rotatable grinding wheel thereon, means including a nut and screw feed mechanism operatively connected to feed said slide in either direction, a grinding wheel truing device including a longitudinally traversable truing tool slide, a transversely movable truing tool on said truing tool slide, means to traverse a truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said nut and screw feed mechanism, a post-process work gage, means actuated by and in timed relation with the longitudinal movement of the truing tool slide to actuate the truing tool feed mechanism and to actuate the feed compensator at the start of each slide movement, and operative connections between the post-process gage and the truing tool feed mechanism and between the gage and the feed compensator to actuate the truing tool feed mechanism when the work piece being gaged is undersize or to actuate the feed compensator when the work piece being gaged is oversize.

2. In a grinding machine, as claimed in claim 1, in combination with the parts and features therein specified in which means actuated by and in timed relation with the longitudinal traversing movement of the truing tool is operatively connected to actuate both the truing tool feed mechanism and the feed compensator at the start of each traversing movement of the truing tool, and means actuated by the post-process gage to actuate the truing tool feed mechanism at any time when the work piece being gaged is undersize or to actuate the feed compensator at any time when the work piece being gaged is oversize during an intermittent truing cycle.

3. In a grinding machine, as claimed in claim 1, in combination with the parts and features therein specified in which a shuttle valve actuated by and in timed relation with the longitudinal traversing movement of the truing tool is operatively connected to actuate both the truing tool feed mechanism and the feed compensator at the start of each traversing movement of the truing tool, and means including a control valve actuated by the post-process gage to actuate the truing tool feed mechanism when the work piece being gaged is undersize or to actuate the feed compensator when the work piece being gaged is oversize.

4. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means actuated by the post-process gauge selectively operable to actuate the truing tool feed mechanism when the work piece being gauged is undersize and to actuate the feed compensator when the work piece being gauged is oversize.

5. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means actuated by the post-process gauge selectively operable to actuate the truing tool feed mechanism when the work piece being gauged is undersize and to actuate the feed compensator when the work piece being gauged is oversize.

6. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means actuated by the post-process gauge selectively operable to actuate the truing tool feed mechanism when the work piece being gauged is undersize and to actuate the feed compensator when the work piece being gauged is oversize.

7. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means selectively actuated by the post-process gauge operable to actuate the truing tool feed mechanism at any time when the work piece being gauged is undersize and operable to actuate the feed compensator at any time when the work piece being gauged is oversize during an intermittent truing cycle.

8. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means selectively actuated by the post-process gauge operable to actuate the truing tool feed mechanism at any time when the work piece being gauged is underside and operable to actuate the feed compensator at any time when the work piece being gauged is oversize during a continuous truing cycle.

9. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means selectively actuated by the post-process gauge operable to actuate the truing tool feed mechanism at any time when the work piece being gauged is undersize and operable to actuate the feed compensator at any time when the work piece being gauged is oversize during an intermittent truing cycle.

10. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, means including a shuttle valve actuated by and in timed relation with the longitudinal traversing movement of the truing tool operatively connected to actuate both the truing tool feed mechanism and the feed compensator at the start of each traversing movement of the truing tool, a post-process work gauge, and means including a control valve actuated by the post-process gauge to actuate the truing tool feed mechanism when the work piece being gauged is undersize and to actuate the feed compensator when the work piece being gauged is oversize.

11. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally for a continuous truing cycle, a truing tool feeding mechanism to feed said truing tool transversely, a wheel feed compensator mechanism operatively connected to impart a compensating adjustment to said feed mechanism, means including a shuttle valve actuated by and in timed relation with the longitudinal traversing movement of the truing tool operatively connected to actuate both the truing tool feed mechanism and the feed compensator at the start of each traversing movement of the truing tool, a post-process work gauge, and means including a control valve actuated by the post-process gauge to actuate the truing tool feed mechanism when the work piece being gauged is undersize and to actuate the feed compensator when the work piece being gauged is oversize.

12. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversly movable truing tool on said truing tool slide, means to traverse said truing tool slide longitudinally through one complete reciprocation for an intermittent truing cycle, a truing tool feeding mechanism to feed said truing tool transversely, a wheel feed compensator mechanism operatively connected to impart a compensating adjustment to said feed mechanism, means including a shuttle valve actuated by and in timed relation with the longitudinal traversing movement of the truing tool operatively connected to actuate both the truing tool feed mechanism and the feed compensator at the start of each traversing movement of the truing tool, a post-process work gauge, and means including a control valve actuated by the post-process gauge to actuate the truing tool feed mechanism when the work piece being gauged is undersize and to actuate the feed compensator when the work piece being gauged is oversize.

13. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means actuated by the post-process gauge selectively operable to actuate the truing tool feed mechanism and to actuate the feed compensator as required to produce a suitable compensation in response to a signal from said post-process gauge indicating the work piece being gauged is undersize or oversize.

14. In a grinding machine having a transversely movable wheel slide, a rotatable grinding wheel thereon, means including a feed mechanism operatively connected to feed slide in either direction, a grinding wheel truing device including a longitudinally traversable truing tool slide, a transversely movable truing tool on said truing tool slide, means to traverse said truing tool slide longitudinally for a continuous truing cycle, a truing tool feeding mechanism to feed said truing tool transversely, a wheel feed compensator mechanism operatively connected to impart a compensating adjustment to said feed mechanism, means actuated by and in timed relation with the longitudinal movement of the truing tool operatively connected to actuate both the truing tool feed mechanism and the feed compensator at the start of each traversing movement of the truing tool, a post-process work gauge, and means actuated by the post-process gauge selectively operable to deactivate the truing tool feed mechanism when the work piece being gauged is oversize and to deactivate the feed compensator when the work piece being gauged is undersize.

15. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, means including a shuttle valve actuated by and in timed relation with the longitudinal traversing movement of the truing tool operatively connected to actuate both the truing tool feed mechanism and the feed compensator at the start of each traversing movement of the truing tool, a post-process work gauge, and means including a control valve actuated by the post-process gauge to control the truing tool feed mechanism and to control the feed compensator as required to produce a suitable sizing compensation in response to a signal from said post-process gauge indicating the work piece being gauged is undersize or oversize.

16. In a grinding machine having a transversely movable wheel slide, a rotatable grinding wheel thereon, means including a feed mechanism operatively connected to feed said slide in either direction, a grinding wheel truing device including a longitudinally traversable truing tool slide, a transversely movable truing tool on said truing tool slide, means to traverse said truing tool slide longitudinally through one complete reciprocation for an intermittent truing cycle, a truing tool feeding mechanism to feed said truing tool transversely, a wheel feed compensator mechanism operatively connected to impart a compensating adjustment to said feed mechanism, means including a shuttle valve actuated by and in timed relation with the longitudinal traversing movement of the truing tool operatively connected to actuate both the truing tool feed mechanism and the feed compensator at the start of each traversing movement of the truing tool, a post-process work gauge, and means including a control valve actuated by the post-process gauge to deactivate the truing tool feed mechanism when the work piece being gauged is oversize and to deactivate the feed compensator when the work piece being gauged is undersize.

17. In a grinding machine having a transversely movable wheel slide, a rotatable grinding wheel thereon, a feed mechanism operatively connected to feed said slide in either direction, a grinding wheel truing device including a longitudinally traversable truing tool slide, a transversely movable truing tool on said truing tool slide, traversing means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, a post-process work gauge, actuating means actuated by and in timed relation with the longitudinal movement of the truing tool slide to actuate the truing tool feed mechanism and to actuate the feed compensator at the start of each slide movement, said actuating means including a first solenoid actuated control valve and a pair of sequence valves, a first selector valve operatively connected in one position to pass fluid under pressure from the first solenoid actuated control valve through the pair of sequence valves to impart a fine feed increment to the truing tool and to impart a fine compensating adjustment to the feed compensator each time the truing tool starts a traversing movement in either direction during a continuous truing operation, and in a second position to render the pair of sequence valves inoperative and to pass fluid under pressure to impart a relatively coarse feeding increment to the truing tool and a relatively coarse feed compensating increment to the grinding wheel each time the truing tool starts a traversing movement in either direction during an intermittent truing operation, a second solenoid actuated control valve operated by said post-process work gauge and a second selector valve operatively connected in one position to pass fluid under pressure from the second solenoid actuated control valve through one or the other of the pair of sequence valves to impart a fine feed increment to the truing tool when the work piece being gauged is undersize, or to impart a feed compensating increment to the grinding wheel when the work piece being gauged is oversize.

18. In a grinding machine having a transversely movable wheel slide, a rotatable grinding wheel thereon, a feed mechanism operatively connected to feed said slide in either direction, a grinding wheel truing device including a longitudinally traversable truing tool slide, a transversely movable truing tool on said truing tool slide, traversing means to traverse said truing tool slide longitudinally through one complete reciprocation for an intermittent truing cycle or continuously for a continuous truing cycle, a truing tool feeding mechanism to feed said truing tool transversely, a wheel feed compensator mechanism operatively connected to impart a compensating adjustment to said feed mechanism, a post-process work gauge, actuating means actuated by and in timed relation with the longitudinal movement of the truing tool slide to actuate the truing tool feed mechanism and to actuate the feed compensator at the start of each slide movement, said actuating means including a first solenoid actuated control valve and a pair of sequence valves, a first selector valve operatively connected in one position to pass fluid under pressure from the first solenoid actuated control valve through the pair of sequence valves to impart a fine feed increment to the truing tool and to impart a fine compensating adjustment to the feed compensator each time the truing tool starts a traversing movement in either direction during a continuous truing operation, and in a second position to render the pair of sequence valves inoperative and to pass fluid under pressure to impart a relatively coarse feeding increment to the truing tool and a relatively coarse feed compensating increment to the grinding wheel each time the truing tool starts a traversing movement in either direction during an intermittent truing operation, a second solenoid actuated control valve operated by said post-process work gauge and a second selector valve operatively connected in one position to pass fluid under pressure from the second solenoid actuated control valve through one or the other of the pair of sequence valves to impart a fine feed increment to the truing tool when the work piece being gauged is undersize, or to impart a feed compensating increment to the grinding wheel when the work piece being gauged is oversize, and operatively connected in a second position to pass fluid under pressure from the second solenoid actuated control valve to close one or the other of the pair of sequence valves to preclude imparting a fine feed increment to the truing tool when the work piece being gauged is oversize, or to preclude imparting a feed compensating increment to the grinding wheel when the work piece being gauged is undersize.

References Cited in the file of this patent
UNITED STATES PATENTS

| | | |
|---|---|---|
| 2,895,265 | Hill | July 21, 1959 |
| 2,897,639 | Hill | Aug. 4, 1959 |